United States Patent [19]

Estes et al.

[11] Patent Number: 5,186,985
[45] Date of Patent: Feb. 16, 1993

[54] LIQUID CRYSTAL DISPLAYS OF HIGH TILT BIAS ANGLES

[75] Inventors: William E. Estes, Pittsboro, N.C.;
David P. Higley, Wilmington, Del.;
Brian C. Auman, Newark, Del.;
Andrew E. Feiring, Wilmington, Del.

[73] Assignee: E. I. Du Pont de Nemours and Company, Wilmington, Del.

[21] Appl. No.: 680,488

[22] Filed: Apr. 4, 1991

[51] Int. Cl.$^5$ .................................. C09K 19/00
[52] U.S. Cl. ............................. 428/1; 359/75; 359/77; 359/78
[58] Field of Search ............... 428/1; 359/77, 78, 75

[56] References Cited

U.S. PATENT DOCUMENTS

| | | | |
|---|---|---|---|
| 4,735,492 | 4/1988 | Sekine et al. | 350/341 |
| 4,749,777 | 6/1988 | Kohtoh et al. | 528/351 |
| 4,864,008 | 9/1989 | Matura et al. | 528/125 |

FOREIGN PATENT DOCUMENTS

| | | |
|---|---|---|
| 228236 | 4/1897 | Japan. |
| 270009 | 6/1987 | Japan. |
| 62-94180 | 10/1988 | Japan. |
| 62-149006 | 12/1988 | Japan. |
| 63-4365 | 7/1989 | Japan. |
| 63-4366 | 7/1989 | Japan. |
| 63-4760 | 7/1989 | Japan. |
| 63153133 | 1/1990 | Japan. |
| 63153134 | 1/1990 | Japan. |

*Primary Examiner*—Alexander S. Thomas

[57] ABSTRACT

Liquid Crystal Display Devices having alignment layers of polyimides which are characterized by pendant perfluorinated chains, preferably linear, and having more than 6 perfluorinated carbon atoms. These alignment layers are capable to provide the Liquid Crystal Display Devices with stable tilt angles of 5 or more degrees.

12 Claims, 4 Drawing Sheets

LIQUID CRYSTAL DISPLAYS OF HIGH TILT BIAS ANGLES

FIELD OF THE INVENTION

This invention relates to liquid crystal displays of high tilt bias angles, and especially those displays comprising polyimide coatings having pendant perfluorinated chains.

BACKGROUND OF THE INVENTION

Liquid Crystal Display (LCD) devices have become increasingly important in displays which require very low consumption of electrical power or where the environment dictates a lightweight, planar, flat surface. Thus LCD's are used in display technologies such as wristwatches, personal computers, aircraft cockpit displays, etc.

In the simplest and most advantageously manufactured form, a field effect LCD device is prepared causing alignment of liquid crystal molecule to occur at a certain angle, the tilt angle, with respect to the plane of the inside of the glass plates. The inside of these glass plates of the LCD device have coatings of sets of electrodes (electrical conductors), usually judicious ratios of indium-tin oxide (ITO) or tin oxide. The sets of electrodes are usually etched conductors into the pattern compatible with the information to be displayed by the LCD. The alignment process is most easily carried out by solution casting (spin coating, roll coating, dipping, spraying, and/or doctor blading) a mixture of various organic polymers onto two glass/ITO substrates. After judicious removal of solvents and/or curing of the polymer layers, the glass plates are usually rubbed or buffed in one direction with cloths. The rubbing process serves to establish a unique optical direction. After rubbing both plates, these plates are rotated with respect to each other (the rotations being in the range from 90-270 degrees), adhered together (using either organic or inorganic adhesives) in such a way as to preserve a constant thickness to a space or gap between the plates, filled with various mixtures of LC molecules, and finally sealed by either organic or inorganic adhesives. At this stage polarizing films are often attached by a lamination process. Finally, electrical connections are made to both plates in a manner consistent with the electrical and display designs.

The use of rubbed polymer films (tilt angle controlling films) dominates the process technology in the production of all categories of nematic Liquid Crystal Displays (LCD's), and polyimides are the most common alignment films in use today. However, the exact relationship between the physical properties of the polyimide surfaces, the rubbing process, and the intrinsic properties of the Liquid Crystal mixtures are poorly understood. Recent works (M. E. Becker, R. A. Kilian, B. B. Kosmowski and D. A. Mlynski (1986); Alignment Properties of Rubbed Polymer Surfaces; Mol. Cryst. Liq. Cryst., 132, 167-180) have shown that tilt bias angle (TBA) reaches a constant limiting value as the rubbing energy increases, the polyimide and the Liquid Crystal mixture being held constant. It is also known that tilt angles vary over wide ranges (0 to 90 degrees) depending on the composition of certain coupling agents (J. Cognard (1982); Alignment of Nematic Liquid Crystals and their Mixtures: Mol. Cryst. Liq. Cryst., Suppl. 1, 1-75; also R. W. Filas and J. S. Patel (1987). Chemically Induced High-Tilt Surfaces for Liquid Crystals; Appl. Phys. Lett., 50(20), 1426-1428).

By combining some of the properties of coupling agents with the nature of certain polymer backbones, one can control the tilt angle by either chain termination or by drastic increases in polymer modulus However, these materials lack in general a wide process latitude. Such examples are given by J. Nehring, H. Amstutz, P. A. Holmes and A. Nevin (1987); High-Pre-tilt Polyphenylene Layers for Liquid-Crystal Displays; Appl. Phys. Lett., 51(16), 1283-1284; and also H. Fukuro and S. Kobayashi (1988); Newly Synthesized Polyimide for Aligning Nematic Liquid Crystals Accompanying High Pretilt Angles; Mol. Cryst. Liq. Cryst., 163, 157-162).

The tilt angle and its magnitude are very important in the various electro-optic responses of the LCD device. The stability, legibility, and reliability of the LCD are all related to the magnitude of the tilt angle and to the unchanging nature of this magnitude. It is very important that the polymer film have the following properties:

(a) Sufficient adhesion to glasses, metals, and transparent conductors (typically mixtures of indium-tin oxides(ITO) or tin oxides) so that the alignment film remains relatively homogenous in covering the substrate, i.e., not rubbed off or cracked by the mechanical energy supplied during the buffing step.

(b) Sufficiently high thermal stability such that subsequent steps in the fabrication of the LCD device, such as lamination of the plates or sealing of the LCD cell do not cause either decomposition of the film or loss of the unique optical direction.

(c) Sufficiently high thermal glass transition temperature, Tg, such that thermal steps which may be necessary in LCD fabrication do not result in loss of the rubbing direction or large induced stresses. Likewise, a high glass transition means that the alignment film will be less likely to melt or deform under heating by the friction caused by the buffing operations.

(d) Sufficient strength in very thin layers (ranging from hundredths of microns to microns) such that the film remains continuous during buffing and such that any subsequent step taken during the processing does not cause either loss of adhesion or breaking of the film due to stresses.

(e) Sufficient inertness, in the chemical sense, so that the alignment film does not behave adversely to the liquid crystal molecules or various agents which may be used to seal the finished display.

(f) Sufficient inertness or stability, in the photo-chemical sense, so that the alignment film does not decompose under light which might need to be transmitted through it or from intense light which may strike it during its intended use.

(g) Sufficient inertness, in the electrochemical and electromotive senses, so that the alignment film does not react with the Liquid Crystal charge under electrolysis conditions or so that the film is not changed by the electric field that must be used to operate the device.

When the above properties of the polymers are maximized, the range of conditions under which they can be used in manufacturing of LCD's is enhanced. Thus, wide latitude is given to the fabrication process, an this, as is understood by those skilled in the fabrication of LCD's, is highly desirable.

Although a number of coupling agents and surfactants may be used to modify the tilt angle, the nature of the polymer is by far more important. Of all the polymer classes or small molecules known to show alignment behavior, polyimides are preferred. It can also be stated that within the class of polymers denoted by polyimides, that many different approaches have been taken with the aim toward finding structures which fulfill the requirements and allow wide ranges of the tilt angles to be realized in practical manufacturing of LCD's.

The repeating structure of polyimides, which can be denoted by wherein, A is one or more residues from an acid dianhydride group and B is one or more residues from diamine compounds actually relies on long chain or strand of the type (—ABABABAB—)n where n is very large. Changes in the intrinsic nature of the polyimide, i.e., those properties which relate to the factors cited above, may be altered by use of certain structures in either A or B above. However, the art of changing the properties of polyimide surfaces and/or controlling the magnitude of the tilt angle while maintaining the intrinsic properties (a)–(g) above is rather difficult. The need to maintain high values of the molecular weight while keeping electronic, spatial, tilt angle magnitude, and/or surface properties under control has been very difficult.

Generally, properties (b), (c), and (d) above are maximized by the use of aromatic-ring (Ar) groups in both the A and B side of the polyimide. In so doing, this also tends to maximize the other properties. When all the alignment film intrinsic properties are at their highest values, the process latitude is highest.

The films of polyimides used to control the tilt angle of liquid crystal molecules in all types of liquid crystal displays (LCD's) are very thin, 100–2000 Å. In a complex process, the tilt is induced in a unique direction of the polymer by gentle buffing with specific cloths. Twisted Nematic LCD's, such as those found in pocket TV sets and watches, need low tilt angles in the range of 1–5 degrees. Super Twisted Nematic (STN) and super twisted birefringent effect (SBE) LCD's, both of which require higher tilt angles, are slower switching devices, typically between 6–25 degrees. The actual tilt angle obtained is a function of polymer ordering on the surface (analogous to cold working of metals), the resulting surface energy (an intrinsic property), the nature of the cloth used to buff the surface (an intrinsic property of its fibers), and the amount of buffing pressure (an extrinsic process variable). In addition to these variables, each of the hundreds of commercial liquid crystal formulations probably interacts differently with a given surface. In general, however, the single most important factor determining the value range of the tilt bias angle is the intrinsic character of the polymer used to control this angle.

Although there is a plethora of patent references dealing with fluorinated polyimides, which are becoming more and more popular, due to their excellent properties and fitness for this application, none of these references has recognized the importance of the length of pendant perfluorinated chains, which have to contain more than 6 perfluorinated carbon atoms, and preferably 8 or more, in order to be effective in raising the tilt bias angle.

U.S. Pat. No. 4,749,777 (Kohtoh et al), issued Jun. 7, 1988, describes a liquid crystal aligning agent consisting essentially of a polyimide resin obtained by the polymerization of a diamine, a tetracarboxylic acid dianhydride and a mono-amine. It is claimed that the addition of the aliphatic mono-amine species can cause high tilt angles. However, use of aliphatic mono-amines in the polyimide structure reduces thermal decomposition temperatures. Use of the aliphatic mono-amine also lowers the molecular weight which results in reduction in strength, as well as in reduction of the glass transition temperature, which is related to the molecular weight. It is seen that these properties are undesirable as mentioned in (a)–(d) above.

U.S. Pat. No. 4,735,492 (Sekine et al), issued Apr. 5, 1988, describes a liquid crystal display device containing a liquid crystal orientation controlling film made from a fluorine-containing polyimideisoindoloquinazolinedione. The device is claimed to have high tilt angle and excellent viewing properties.

U.S. Pat. No. 4,864,008 (Murata et al), issued Sep. 5, 1989, describes an invention which provides diamino compounds having pendant hydrocarbon groups, and liquid crystal aligning films comprising polyimides which are obtained from the diamino compounds. Since, however, the pendant groups contain long chains of —$CH_2$—$CH_2$—, their ultimate thermal stability is considerably lower; generally speaking, aliphatic species, which contain at least two methylene groups (—$CH_2$—$CH_2$—) in a side by side arrangement, decompose by elimination of hydrogen ($H_2$) and olefins (commonly called beta-hydride elimination). These thermal decompositions are usually below about 250° C. Also, it can be recognized that their glass transition temperatures are also much lower. Several species of this disclosure, were claimed to change tilt with the number of rubbing cycles, and this implies that the inertness of the polymer is not great with respect to mechanical energy being put into the film by the rubbing process, clearly a narrowness in process latitude, which is quite undesirable from a manufacturing perspective.

Japanese Patent Application Publication 2-4225 (Application No: 63-153134) (Minamizawa et al), publication date Jan. 9, 1990, describes a process for the manufacture of a liquid display element comprising heat treating a liquid crystalline orientation film of a polyimide obtained by treating a dicarboxylic acid anhydride with a fluorine-containing diamine, under a condition of liquid crystals in contact therewith to a temperature at least as high as the liquid transition temperature of said liquid crystal.

Japanese Patent Journal Kokai Patent No. HEI 1[1989]-180860 (Application No.: Sho 63[1988]-4760) (Matsuura et al), publication date Jul. 18, 1989, describes an aromatic diamine containing pendant groups of the formula —O—$(CH_2)_n(CF_2)_mF$, in which n is 1 or 2 and m is 0 to 10.

Japanese Patent Journal Kokai Patent No. SHO 63[1988]-259515 (Application No.: Sho 62[1987]-94180) (Mukatomi et al) publication date Oct. 26, 1988, Japanese Kokai Patent No. Hei 1(1989)-180518 (Application No.: Sho 63(1988)-4365) (Hisatomi et al), publication date Jul. 18, 1989, and Japanese Kokai Patent No. Hei 1(1989)-180519 (Application No.: Sho 63(1988)-4366)

(Hisanagi, et al), publication date Jul. 18, 1989, describe liquid crystal display device orienting agents, which consist of polyimide resins, which contain perfluoroalkyl groups containing 1-6 perfluorinated carbon atoms.

Japanese Patent Application Publication Kokai: Sho 63-313124 (Application No.: Sho 62-149006) (Yokokura et al) publication date Dec. 21, 1988, describes a liquid crystal display element comprising a polyimide orientation film, which is the reaction product of a diamine compound having long chained hydrocarbon groups, a diamine compound having trifluoromethyl groups and a tetracarboxylic dianhydride.

Japanese Kokai Patent No. Hei 2(1990)-4224 (Application No.: Sho 63(1988)-153133) (Hitachi et al) publication date Jan. 9, 1990, describes a method for manufacturing a liquid crystal display device wherein a liquid crystal is heated at a temperature equal to or higher than the liquid transition point of said liquid crystal while said liquid crystal is being contacted with a liquid crystal orientation film consisting of a fluorine atom containing polyamide polymer.

Japanese Kokai Patent No. Sho 62(1987)-127827 (Application No. Sho 60(1985)-270009) (Sato et al), publication date Jun. 10, 1987, and Japanese Kokai Patent No. Sho 62(1987)-87939 (Application No. Sho 60(1985)-228236) (Sato et al), publication date Apr. 22, 1987, describe compositions for liquid crystal oriented films which contain a polyamide acid or polyimide, respectively, and at least on of the acid or diamine contains fluorine atoms.

SUMMARY OF THE INVENTION

According to this invention, there is provided an improved liquid crystal display device of the type having a common liquid crystal layer with opposite sides, a set of electrodes on either side of the liquid crystal layer, and an alignment polyimide layer between each set of electrodes and the common liquid crystal layer, wherein the improvement comprises in that the polyimide contains pendant perfluorinated chains of more than 6 perfluorinated carbon atoms, and preferably of 8 or more perfluorinated carbon atoms. Linear chains are preferable. A suitable range of perfluorinated carbon atoms is from 7 to 22 carbon atoms and more preferably up to 18.

Preferably, the alignment polyimide layer is adaptable to provide the liquid crystal layer with a constant tilt angle of 5 degrees or more. It is also preferable that the pendant perfluorinated chains are contained in the polyimide in an effective amount to provide the liquid crystal layer with a constant tilt angle of 5 degrees or more.

It is further preferred that the polyimide comprises a reaction product of an acid dianhydride and a diamine, wherein the pendant perfluorinated chains are part of the diamine. A preferred dianhydride is 3,3',4,4'-benzophenonetetracarboxylic acid dianhydride, because it provides better adhesion, especially to glass substrates. Preferred diamines are 3,5-diamino-1-perfluorooctylbenzene, 2-perfluorooctyl-4,6-diaminomesitylene, and 4-(1,1,11-trihydroperfluorounecyloxy)-1,3-phenylenediamine.

DESCRIPTION OF THE DRAWING

The reader's understanding of preferred embodiments of the present invention will be enhanced by reference to the following detailed description in conjunction with the drawing figures, wherein.

DETAILED DESCRIPTION OF THE INVENTION

As already pointed out, this invention relates to liquid crystal displays of high tilt bias angles, and especially those displays comprising polyimide coatings having pendant perfluorinated chains.

The configuration of Liquid Crystal Displays is described in different publications, such as many of the ones cited above. In addition, a monograph titled "Liquid Crystal TV Displays; Principles and Applications of Liquid Crystal Displays" by E. Kaneko, published by KTK Scientific Publishers, Tokyo, Japan (1987), gives an excellent overview of the different construction designs regarding Liquid Crystal Displays, especially on pages 15-73.

Figure 1:
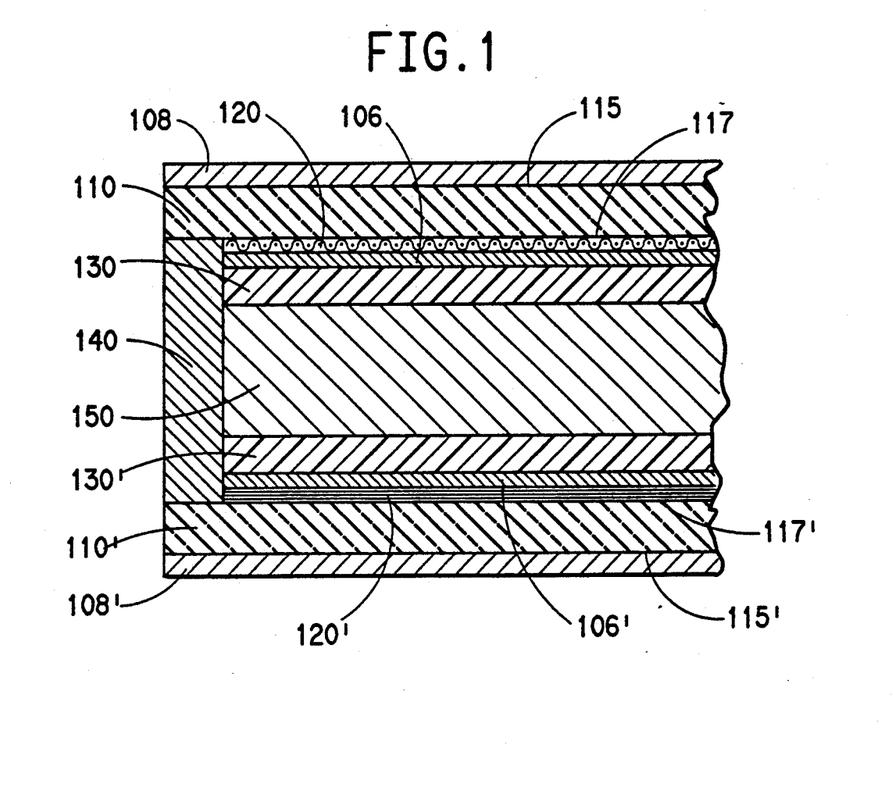
FIG. 1 is a schematic fragmental cross-sectional view of a typical Liquid Crystal Display.

A typical twisted nematic liquid crystal display cell in the form of a sandwich is shown in FIG. 1. Starting from the outside, it comprises a pair of light polarizers 108 and 108' deposited on the outside surfaces 115 and 115' of the transparent substrates 110 and 110', respectively. The directions of polarization of the two polarizers are substantially perpendicular to each other. The transparent substrates 110 and 110' are usually glass or silica having a nominal thickness of the order of 0.5 to 1 mm. The substrates 110 and 110' are the structural supports of the rest of the elements. On the opposite sides 117 and 117' of the transparent substrates, there is disposed a grid of one set of parallel transparent electrodes 120 and a second set of parallel transparent electrodes 120', such as Indium /Tin oxide for example, the two sets being preferably disposed in perpendicular directions with respect to each other. Usually these transparent electrodes are deposited at a thickness in the range of 300 to 400 Å. In the case of using Indium/Tin oxide as the transparent electrodes, it is advisable to deposit on top of them passivation layers 106 and 106', respectively, since the Indium/Tin Oxide electrodes may contain ionic impurities, such as F−. The passivation layers 106 and 106' may comprise silicon dioxide and titanium dioxide, and deposited by a dip and fire process, well known to the artisans. The thickness of the layers 106 and 106' is usually in the region of 1,000 to 2,000 Å. On top of each passivation layer, alignment or orientation layers 130, and 130', respectively, are deposited, usually by spin-coating and curing. The alignment or orientation layers have usually a thickness of 200–2,000 Å, and the preferred construction material is polyimide. Alignment of these layers is performed by rubbing techniques well known to the art as better described at a later section. Finally, the liquid crystal material 150 is sandwiched between the two sub-assemblies, at a nominal thickness of 1–10 micrometers, with sealant 140 to complete the Liquid Crystal Display Cell. The Liquid Crystals assume a spiral orientation through the thickness of the layer following the alignment of the molecules of the two alignment layers 130 and 130', which have directions substantially perpendicular to each other.

In operation, when the cell is in an unenergized condition, light which passes through polarizer 108' becomes polarized. As it continues its path through the liquid crystals, which have been oriented in a spiral manner by the alignment layers, its angle of polarization changes accordingly by about 90 degrees by the time it has reached polarizer 108. Since the direction of polarization of the two polarizers 108 and 108' differs by substantially 90 degrees, the light passes freely through polarizer 108. When an adequately high electric potential is applied between one or more electrodes of one set 120 and one or more electrodes of the second set 120', the Liquid Crystals assume linear orientation throughout the thickness of layer 150 in the respective regions affected by the potential, and thus any polarized light passing through polarizer 108' is stopped by polarizer 108. It should be pointed out that this is only an example of a configuration of a Liquid Crystal Display Cell. Many other configurations are known to the artisans, as described in the aforementioned references. Depending on the particular application, the type of the Liquid Crystals used, and other considerations, a number of the aforementioned elements may not be necessary, or additional elements added.

It has been found by the applicants that polyimide tilt angle controlling films (alignment or orientation layers) having pendant fluorocarbon chains of more than six perfluorinated carbon atoms are very effective in controllably increasing the tilt angles of liquid crystals considerably. When the carbon chain contains 6 or less perfluorinated carbon atoms, a transient increase may be observed, which however, has a very short life, and disappears prematurely.

One would expect to see a gradual rise in tilt bias angle when using polyimide films having gradually longer pendant fluorocarbon chains. However, an unexpected permanent abrupt rise occurs in the tilt bias angle for pendant chains having a number of perfluorinated carbon atoms larger than 6, and more particularly 8 or more. In addition, the tilt angle increase is permanent in the case of chains having a number of perfluorinated carbon atoms 8 or larger. In some instances, such as shown in Example 15 regarding a diamine containing a chain of 6 perfluorinated carbon atoms, initially a relatively high value is obtained for the Tilt Angle, which however falls to a low value within an unacceptably short time (one day). The unexpected behavior of perfluorocarbon groups containing more than six perfluorinated carbon atoms, has been used according to this invention as a means to prepare high molecular weight polymers, with high thermal and oxidative stability, which polymers also provide tilt angles in the range that can be used to align supertwisted nematic (STN: tilt range needed from 0 to about 15 degrees), and supertwisted birefringence effect (SBE: tilt angle of 25 degrees needed for optimum performance) liquid crystal display cells. Although the pendant chain may be at any point of the polyimide structure, it is preferable that it is originated on the amine part of the polyimide. This is because, among other reasons, it is less complex, and thus less expensive to prepare the amines with the pendant fluorocarbon chains, than it is to prepare the corresponding anhydrides.

It is preferable that the amines used for introducing the fluorocarbon chains are diamines as compared to mono-amines. The reason is that the diamines do not limit the length of the molecule, and high molecular weight polyimides may be prepared having correspondingly outstanding physical properties. On the other hand, mono-amines may be used only as end-capping entities, and therefore they limit necessarily the length of the molecule, thus restricting the molecular weight and degrading the physical properties of the resulting polyimides. One serious manifestation of such degradation is cracking of the film, as well as sensitivity to strong polar solvents after curing. Thus, it is preferable that when mono-amines are used, be used in rather small quantities, and in conjunction with diamines.

Aromatic amines are preferred to aliphatic ones, since among other reasons, the thermal/oxidative stability of aromatic compounds is considerably higher than that of aliphatic ones, and in the case of liquid crystal displays, at least one step requiring thermal/oxidative stability is involved, as well known to the artisans.

Fluorocarbon pendant chains are considerably superior to hydrocarbon chains, as exhibiting significantly higher thermal and oxidative stability. In addition, they provide the controlling film with lower surface energy, which seems to be highly beneficial in most cases in increasing the tilt bias angle. Especially vulnerable to thermal/oxidative stability are polymers containing hydrocarbon chains in the backbone, since any cleavage of such chain causes considerable lowering of the molecular weight and degradation of the properties. Even pendant long chains of hydrocarbon groups decompose by elimination of hydrogen (H2) and olefins, usually below about 220° C. Also, they decrease the polyimide's glass transition temperatures appreciably more than their perfluorocarbon counterparts.

According to this invention, use is made of fluorinated carbon atom chains, abbreviated as Rfx (where Rf stands for the perfluoroalkyl chain and the, x, refers to the number of perfluorinated carbon atoms within this chain), attached to the diamine portion of the polymer strands. The extreme tenacity of the carbon fluorine bond provides uncommonly high degree of thermal stability. In some instances, these Rfx groups are attached directly to the cyclic aromatic ring structures, i.e., Ar—Rfx, without any intervening atoms, such as for example in the structure:

The above species has highest overall thermal stability. In yet other cases, the Rfx group has been attached in very close proximity to the aromatic ring through intervening atoms which were chosen to maintain high thermal stability of polymers which were based on them, i.e., Ar—O—CH$_2$—Rfx and Ar—C(CH$_3$)2—Rfx structures:

-continued

The monomeric species Rfx-Diamine compounds shown above, have been used to prepare a series of poly(amic acid)s. The poly(amic acid) structures are, as is well known to those who practice polyimide technology, the soluble precursors to polyimides. Additionally, the poly(amic acid)s thus derived are of high molecular weight.

It was discovered by the applicants, as aforementioned, that the length of the perfluorocarbon branch group (Rfx) and the position of this branching group on the polymer chain have profound influences on the magnitude of the tilt angle; in certain Rfx lengths and at certain concentrations of the Rfx-DA monomer, the tilt angle can range from values of 5-60 degrees; surprisingly, the change from low tilt angle, i.e., under 5 degrees, to higher tilt angles, i.e., the range from 5 to at least 45 degrees, shows an abrupt rise. This range of high tilt angles can cover applications in supertwisted nematic (STN) LCD's, tilts needed for STN lie in the range from about 6 to about 25 degrees; furthermore, the supertwisted birefringence effect (SBE) LCD, essentially a sub-division of STN technologies, requires tilts above 25 degrees for optimum performance. It is believed that the high tilt angles, which obtain in these polymers, can also provide alignment in ferroelectric liquid crystals (FLC's).

In keeping with the practical utilization of the unique monomers and their respective polymers in this invention, it was found that mixtures (also called blends in the parlance of polymer technology) of polyamic acids could be prepared by using different amounts of the perfluoroalkyl-branched diamine (abbreviated Rfx-DA) compounds. In turn, the resulting soluble poly(amic acid) solutions could be mixed with various amounts of other poly(amic acid)s containing the Rfx-DA. After suitable equilibration, the mixtures remain homogeneous in character and soluble. Furthermore, if these blends are processed, as will be described below, one can obtain optically homogeneous films of polyimides. The tilt angles of these blends are observed to be intermediate between the extremes of polyimides formed from the polyamic acid, which contains the Rfx-DA compounds and the poly(amic acid), which does not contain the fluoroalkyl branch. It is believed that the equilibration or mixing process results in the random, re-distribution of the Rfx-DA groups for the DA groups and/or the re-distribution of various lengths of poly(amic acid) chains to yield new, random distributions of the branch groups, —Rfx, along the poly(amic acid) chains. In summation, this ability to blend or mix preformed poly(amic acid)s while maintaining homogeneity of the polyimides, which will be derived from them, greatly enhances the manufacturing process of these polymers. For instance, it allows one pre-cursor polyamic acid preparation to be conducted with other polyamic acids in order to adjust the properties of the polyimides derived from them. Thus, the range of properties of polymers can be extended, and these can be closely controlled for specific applications.

The perfluoroalkyl substituted aromatic diamines of the present invention may be prepared using a fluoroalkylation process wherein a bromine atom is replaced on an aromatic ring containing two nitro-groups (—NO$_2$), which become amino groups (—NH$_2$) after suitable chemical reduction.

Thus, 1,3-diamino-5-perfluoroalkylbenzene (also referred to as 5-perfluoroalkyl-meta-phenylenediamine or 5RfxMPD) and 1,3-diamino-5-perfluoroalkylmesitylene (also referred to as 5-perfluoroalkyldiaminomesitylene or 5RfxDAM) may be prepared using Rfx groups which range from one to ten or more fully fluorinated carbon atoms. Surprisingly, it was found that the length of the perfluoroalkyl chain caused an abrupt increase in the tilt angle when the perfluoro group was eight perfluorinated carbon atoms or longer. By way of illustrative example, a series of poly(amic acids), which were based on the parent structure, Du Pont Pyralin 2555: 3,3',4,4'-benzophenonetetracarboxylic dianhydride (BTDA), 4,4'-oxydianiline (ODA), and metaphenylenediamine (MPD), BTDA/ODA/MPD, the tilt angle of which is about 2-3 degrees. Several different polyamic acids were prepared in such a way that a constant mole percentage of the MPD structure was replaced by 5RfxMPD or 5RfxDAM (the replacement concentrations being 10 mole per cent, based on total diamine). When this series of polyimides were used as alignment films, it was found that the fluorocarbon chains whose length was between one (1) and six (6) showed substantially the same, low values of tilt, i.e., they were in the range from 2-4 degrees. However, the members of this homologous series, which contained eight (8) perfluorinated carbon atoms yielded tilt angles in the range from 6-13 degrees. Those skilled in the design of LCD devices will recognize that the tilt range from 1-4 is typically useful for so-called twisted nematic (TN) LCD's, while the STN types of LCD's require tilt angles higher than 5 degrees and SBE type LCD's require even higher values. In any case, materials giving angles of at least 5 degrees are of high interest to the Industry, since materials providing high tilt angles may be diluted to provide any desirable value smaller than the one corresponding to their maximum potential. Even in the case of using diamines with perfluorinated branches of 6 perfluorinated carbon atoms in a high enough quantity to provide the same amount of fluorine as the corresponding diamine with perfluorinated branches of 8 perfluorinated carbon atoms, the tilt angle still remains low (see tilt angles corresponding to the polyimide of Example 32 as compared to the tilt angles of Example 13 in Table II).

The polyimides of this Invention show tilt angles, which have a strong dependence upon the concentration of the long (greater than six perfluorinated carbon atoms), perfluorinated alkyl chain. When polyimides derived from BTDA/ODA/MPD are prepared such that the mole percentage of Rf8-MPD is increasingly substituted for MPD, the tilt angles vary as shown below:

TABLE I

| # | PI COMPOSITION | TILT ANGLE |
|---|---|---|
| 1 | BTDA (100 mole %)*<br>ODA (50 mole %)<br>MPD (40 mole %)<br>Rf8-MPD (10 mole %)** | 8 Degrees |

TABLE I-continued

| # | PI COMPOSITION | TILT ANGLE |
|---|---|---|
| 2 | BTDA (100 mole %)<br>ODA (50 mole %)<br>MPD (35 mole %)<br>Rf8-MPD (15 mole %) | 15 Degrees |
| 3 | BTDA (100 mole %)<br>ODA (50 mole %)<br>MPD (30 mole %)<br>Rf8-MPD (20 mole %) | 35 Degrees |
| 4 | BTDA (100 mole %)<br>ODA (50 mole %)<br>MPD (50 mole %)<br>Rf8-MPD (0 mole %) | 2.3 Degrees |

*Based on total dianhydride
**Based on total diamine

The values of the tilt angles of the polyimides according to this invention were determined by the magneto-capacitance null (MCN) method. In this technique, LCD test cells are rotated in a magnetic field.

Examples of making uncomplicated liquid crystal cells according to this invention are given below. These simple cells are suitable for test purposes. Evidently, grids of transparent electrodes should be used in place of the single electrodes where the liquid crystals in the cell are to provide a pattern, and light polarizers, preferably positioned on the outside surface of each substrate for different applications. In addition, reflection type liquid crystal devices may require a reflective surface on one side of the Cell. The references provided hereinabove give an excellent background regarding the manufacturing and operation of liquid crystal devices in general. An important requirement of the instant invention is that the polyimide used as an alignment film in the cell structure has pendant perfluorinated chains of more than six perfluorinated carbon atoms.

Method of measuring Tilt Angles

Figure 2:
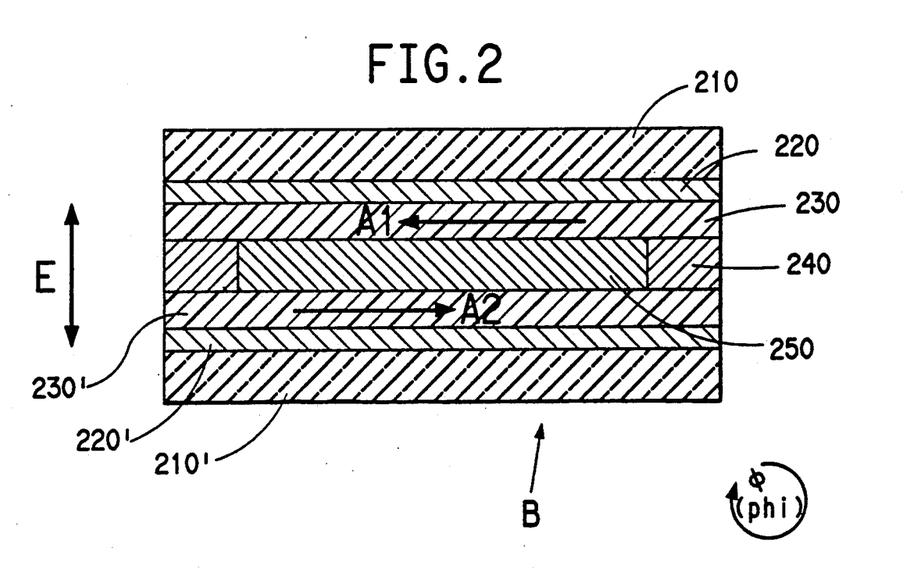
FIG. 2 is a schematic cross-sectional representation of a Liquid Crystal Cell for test purposes.

FIG. 2 represents a cross-section of a LCD test cell that was used for the magneto-capacitance null (MCN) method of measuring tilt angles. More specifically, the cell comprised a sandwich of two glass plates 210 and 210'. Each glass plate was either Corning #7059 low-alka glass or Donnelly Corporation, #5005 soda lime glass. The glass plates 210 and 210' were coated with a continuous coating of indium tin oxide (ITO) 220 and 220', which served as a transparent conductor, and it was applied by well known to the art methods. The thickness of the ITO coatings 220 and 220' ranged from 350-2500 Å. A polyimide film 230 and 230' according to this invention was applied on the ITO films 220 and 220', and then cured to yield thicknesses from 500-5000 Å, although in the case of most test cells the polyimide film thickness was either approximately 2500 or approximately 1000 Å. An adhesive 240, was used to seal the cell; it was either Du Pont Pyralux Sheet Adhesive (E. I. du Pont de Nemours and Company, Wilmington, Delaware, hereinafter "Du Pont"), which had a nominal thickness of 25 micrometers, or a screen printable epoxy #B9021-67, from Epoxy Technology, Billerica, Mass. A liquid crystal mixture 250, ZLI-2293 from E. Merck (Darmstadt, Germany) was placed within the cell, as explained hereinafter. The arrows A1 and A2 along the polyimide film are the directions in which the films on the respective plates were rubbed or buffed as explained hereinunder. Thus, the test cells were assembled with the directions of the plates antiparallel to each other. The symbol E shows the direction of the electric field. The symbol, B, represents the direction of the applied magnetic field. The angle, $\phi$ (phi), was the angle through which the cell could be rotated with respect to the fixed direction of the magnetic filed, B.

Figure 3:
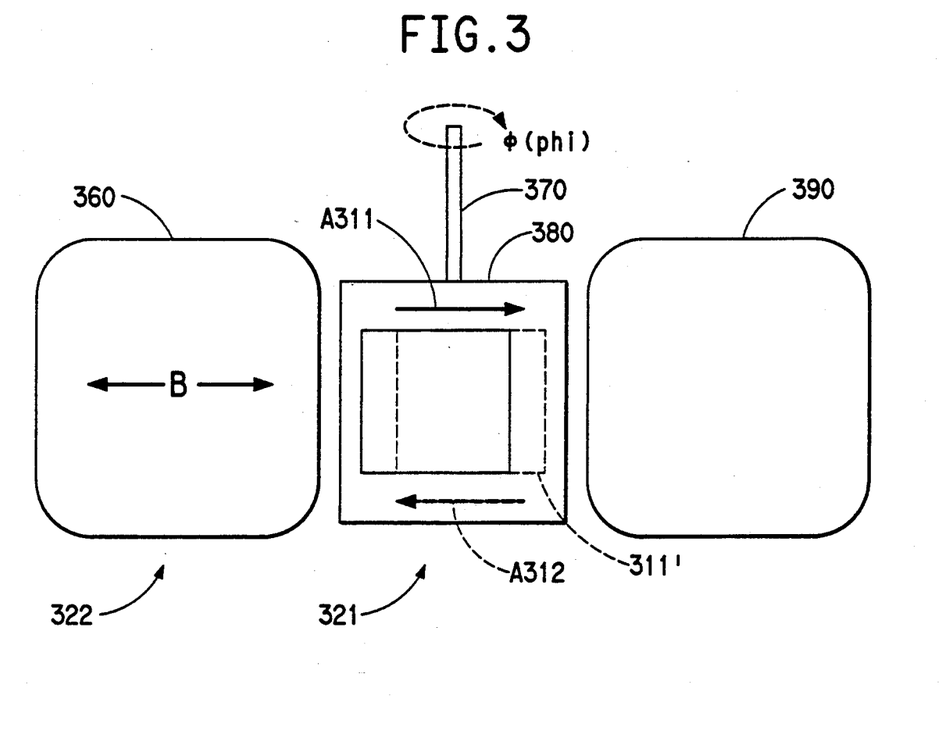
FIG. 3 is a schematic representation of a device for obtaining data useful in the determination of the tilt angle corresponding to the alignment film of the Cell of FIG. 2.

FIG. 2, not drawn to scale, shows the apparatus 321 used to hold the cell of FIG. 2 as well as the magnet 322 for providing the magnetic field having the direction shown by the arrow B, between the magnet's pole faces, 360 and 390. Two different magnets were used, namely a Varian E-9 from Varian Co., Walnut Creek, Calif., and a PAR, model 151 from Princeton Applied Research, Princeton, N.J. Each was capable of attaining any magnetic field strength from 0 to 20 kilo Oersteds (kOe). A holder rod 370 allowed rotation of the apparatus 20 between 0 and 360 degrees, the angle $\phi$ (phi) as shown, when the PAR magnet was used. When the varian E-9 was used, the holder rod 370 was fixed and the entire magnet assembly could be rotated through 0-75 degrees. A holder 380 supported the test cell on the holder rod 370. The two plates 311 and 311' of the LCD test cell are shown here with the plane of the glass being in the plane of the page; the glass plates 311 and 311' were off-set slightly to allow solder interconnect of the ITO conductors to a capacitance bridge (not shown). The directions of the rubbing of the respective plates, are shown by arrows A311 and A312.

The angular variation of the capacitance between the plates 311 an 311' was determined as a function of this applied field. As long the measuring voltage (milli-volt range) of the capacitance bridge is kept well below the threshold voltage of the LC mixture (typical threshold voltages are of the order of 2-3 volts) the electric field, E in FIG. 2, does not influence the tilt angle. The angle at which the capacitance is not affected by an increasing magnetic field is the tilt angle. This method has the advantage that it does not require the dielectric constants of the liquid crystal mixture to be known nor does it require that the test structure's thickness be known. It is also able to estimate the tilt angle of cells, the alignment of which may not be homogeneous, i.e., cells where contamination or impurities from fabrication methods may cause a portion of the cell's alignment film to fail, since the slope measurements can be carried out in strong magnetic fields. Furthermore, it can determine any tilt angle from nearly zero (0) to ninety (90) degrees. Specific details of the cell fabrication are included in the section below.

A GenRad, model 1688 Digibridge, operating at 5 kilo Hertz was the capacitance detector. These cells measured 1.25×2.50 centimeters, and the nominal thickness of the liquid crystal layer was about 25 micrometers. E. Merck (Darmstadt, Germany) liquid crystal mixture, ZLI-2293, was used for the tests.

Rubbing process for making cells

A surface burnishing machine, model SBM-200 (Engineered Technical Products, Somerville, NJ) was fitted with a 4 inch diameter by 6 inch wide buffing wheel. The SBM apparatus consisted of a fixed wheel, which had a micrometer adjustment in its vertical travel; by adjusting the travel micrometer downward, the pressure on the glass could be increased. A flat platform, which moved uni-directionally under the buffing wheel, held the glass in position by a vacuum chuck. This platform moved under the wheel at a constant speed. Two different buffing wheels were used. Aramid felt on cardboard tubes was supplied by the Hurt Machine Products Co. The Aramid fibers, a Du Pont polyarimide, were 250 microns in diameter and the felt layer was approximately ⅛ inch thick. A velvet rayon rubbing cloth (product #B-7 from Maeda Co., Ltd, Osaka, Japan) was used in some of the tilt angle measurements. This velvet was 120 denier with the fiber length being about 2 mm. Thus, this process allowed various amounts of rubbing energy to be used while two different types of buffing materials could be used. Two different cells were used for the MCN determination of the tilt angles. These are described below.

Coating of the plates

A Silicon Valley Group (Silicon Valley, Calif.), SVG-81, automated spin coater was used to apply the alignment films to both glass substrates and silicon wafers, which were used to study the film's ellipsometry. This system had the capability to spin parts from 0–6000 RPM. Solutions of the poly(amic acid) pre-cursors to the polymers of this invention were coated onto two types of glasses, which had transparent ITO conductors on their inner surfaces.

Corning Glass Works, #7059 coated with about 250-300 Å of ITO and Donnelly Display Coatings, #5005 soda lime glass with 2500 Å of ITO. In some instances, the glass was treated with an amino silane coupling agent, Du Pont VM-651 as a 0.05% aqueous solution. When the VM-651 was used, the plate was baked on the automatic hot plate module for 45 seconds at 90° C., and then they were immediately coated with the poly(amic acid) solutions. These polymer coatings were spun at their respective spin speeds for 30–45 seconds, and then baked on the hot plate for 45 seconds at 90° C.

Curing of the polymer films was performed in a Vacuum Atmospheres (Los Angeles, CA) programmable oven, which had the capability of using reduced pressures (from ~25 inches Hg vacuum up to one atmosphere) and/or inert atmospheres. Typical cure profiles were as follows: a bake at 90° C. for 15 minutes, ramp of oven's temperature from 90–150° C. in less than one hour, ramping from 150° C. to the peak cure temperature (usually between 215° C. to about 300° C.), a 30 minute stay at the peak, and finally a slow cool down to room temperature. After removal from the cure oven, the glass plates were rubbed as described above.

Methods of cell fabrication

In a first method, the glass/ITO coated plates were sputtered with chromium (about 1000 Å thickness) across their end edges by a mask placed over each plate. This allowed a continuous conductor to run over the edge of the end of each plate of the cell.

Pyralux sheet adhesive #LF-0100 (from Du Pont, Wilmington, Del.), a b-staged acrylic adhesive film approximately 25 micrometers in thickness, was cut to the desired shape (small gaps were left in the adhesive to allow filling of the LC mixture), and placed onto one glass/ITO surface by hand. Then, the second plate was placed on top of this structure in such a way that the direction of its rub was opposed to that of the first plate, i.e., the rubbing directions of the plates were anti-parallel, as shown in FIG. 2.

The above construction was transferred to a heated press, and it was laminated at 150° C. for 20 minutes under an applied pressure of 30 pounds per square inch (psi). The assembled cells were filled with the Liquid Crystal mixture by initially drawing a vacuum on the assembly, placing drops of the mixture on one gap space, and then allowing the mixture to infiltrate the space between the plates. After filling was complete, the fill gap or port was sealed with a UV-curable adhesive (LOCTITE, LITETAK 375). Next, the assembled and filled cell was heated slowly to a temperature above its nematic-to-isotropic phase transition, i.e., the N-I clearing point. The cells were held at about 90° C. for 30 minutes, which temperature is above the N-I point of 85° C. in the case of Merck's ZLI-2293 Liquid Crystal mixture.

For testing, the cells were placed in a cell holder as shown in FIG. 3, which had two spring loaded metal contacts (not shown) for contacting the Cr edge coating. Electrical leads from these two contacts were attached to the GenRad 1688 Digibridge capacitance bridge as aforementioned. Cells made with this method were tested with the system described above using the Varian E-9 magnet. This magnet had a wider access bore, but the rotation angles were restricted to the 0–75 degree range because the magnet was rotated while the cell was held fixed.

According to a second method, the plates 210 and 210' were coated, cured, and rubbed as cited above. After rubbing, an adhesive perimeter seal was printed onto one plate using a screen printable epoxy formulation #B9021-6 from Epoxy Technology. The coated plate was dried at 75° C. The plate was sprinkled with glass bead spacers (from E. Merck, Darmstadt, Germany), about 10 micrometers in diameter, to prevent interplate shorts. The second plate, with its rub direction opposed was placed over the pattern, and this construction was placed in a heated press at 150° C., 20 psi pressure for 1 hour. After removal from the lamination press, the cells were filled as above, sealed with the UV adhesive, and heated above the clearing point. Electrical connections were made by two different techniques. Initially a small stripe of a silver filled epoxy SE-4621D (Du Pont) was screen printed to the extended edge of the ITO/glass plates with braided electrical wire being attached to this and carefully pressing it with a soldering iron. After some experimentation, however, it was found that the wire could be soldered directly to the ITO edge by using pure indium metal. These wires could then be attached to the Digibridge for testing with the PAR 151 magnet system.

The tilt angles and other data are given in the table below regarding the polyimide structures of the examples which follow, when used as alignment films.

TABLE II

Collected Results of Tilt Angles and

| POLYIMIDE FROM EX. # | $n_f$ | t(Å) | TILT | Method | AP | CLOTH |
|---|---|---|---|---|---|---|
| 22 | 1.675 | 3500 | 7.7 | A | Y | Aramid |
| 23 | 1.675 | 1000 | 12.6 | B | Y | Aramid |
| 11 | 1.664 | 1000 | 37.4 | B | Y | Aramid |
| 10 | 1.664 | 1000 | 15.32 | B | Y | Aramid |
| 11 | 1.664 | 1000 | 16.21 | B | Y | Aramid |
| 10 | 1.664 | 1000 | 10.34 | B | Y | Aramid |
| 10 | 1.664 | 1000 | 7.6 | B | Y | Aramid |
| 12 | 1.660 | 750 | 46.0 | B | Y | Aramid |
| 12 | 1.660 | 750 | 48.52 | B | Y | Aramid |
| 12 | 1.660 | 750 | 50.0 | B | Y | Aramid |
| 14 | 1.670 | 650 | 2.0 | B | Y | Aramid |
| 14 | 1.670 | 650 | 3.0 | B | N | Aramid |
| 13 | 1.670 | 700 | 9.3 | B | N | Aramid |
| 13 | 1.670 | 700 | 5.85 | B | N | RAYON |
| 14 | 1.670 | 650 | 3.0 | B | N | RAYON |
| 15 | 1.67 | 1000 | 2.75 | B | N | RAYON |

TABLE II-continued

Collected Results of Tilt Angles and

| POLY-IMIDE FROM EX. # | nf | t(A) | TILT | Method | AP | CLOTH |
|---|---|---|---|---|---|---|
| 16 | 1.67 | 1000 | 2.86 | B | N | RAYON |
| 16 | 1.67 | 1000 | 1.90 | B | N | RAYON |
| 17 | 1.67 | 1000 | 2.46 | B | N | RAYON |
| 17 | 1.66 | 1000 | 2.80 | B | N | RAYON |
| 32 | 1.67 | 1000 | 3.25 | B | N | RAYON |
| 18 | 1.66 | 1000 | 29.6 | B | N | RAYON |
| 26 | 1.78 | 2500 | 2.3 | A | Y | Aramid |
| 27 | 1.75 | 2300 | 16.7 | A | Y | Aramid |
| 28 | 1.77 | 3500 | 9.67 | A | Y | Aramid |
| 30 | 1.78 | 2500 | 2.5 | A | Y | Aramid |
| 31 | 1.95 | 2500 | 3 | A | Y | Aramid |

Footnotes for Table II
*Aramid is Nomex Aramid
1. nf = Refractive index of polyimide film; determined by ellipsometry using 633 nanometer line of HeNe laser, with Gaertner L-126B system.
2. t(A) = film thickness in Å; determined by ellipsometry, as under 1.
3. TILT = tilt angle measured by magneto-capacitive method using E. Merck ZLI-2293 liquid crystal mixture.
4. Method refers to which type of cell and which magnet was used to determine the tilt angle:
METHOD A: Used Varian E-9 magnet; larger cells and Pyralux sheet adhesive
METHOD B: Used PAR 151 magnet, B9021-6 epoxy, smaller cells than METHOD A
6. AP = Adhesion promoter used (Y = Yes, N = No)
7. CLOTH = type of rubbing cloth used for the cell.

GLOSSARY

| | |
|---|---|
| A: | Angstrom |
| BTDA: | 3,3',4,4'-benzophenone-tetracarboxylic dianhydride |
| DA: | diamine |
| Du Pont Pyralin 2555: | BTDA/ODA/MPD |
| F-113: | 1,1,2-trichlorotrifluoroethane |
| ITO: | indium-tin oxide |
| kOe: | kilo Oersteds |
| L: | liter |
| LCD: | Liquid Crystal Display |
| MCN: | magneto-capacitance null method |
| mp: | melting point |
| MPD: | meta-phenylenediamine |
| N-I: | nematic to isotropic point |
| NMP: | N-methyl-2-pyrrolidone |
| ODA: | 4,4'-oxydianiline |
| PAR: | Princeton Applied Research, Princeton, NJ |
| 3-PFDPA: | 3-perfluorodecyl-1-propylamine |
| Rfx: | perfluorocarbon branch group |
| RfbMPD: | 5-(1H,1H-2,2-bis [trifluoromethyl]heptafluoropentane)-1,3-phenylenediamine |
| 5RfxMPD: | 1,3-diamino-5-perfluoroalkylbenzene, or 5-perfluoroalkyl-meta-phenylenediamine, x being the number perfluorinated carbon atoms of the perfluoroalkyl group |
| Rf10-O-MPD: | 4-(1,1,11-trihydroperfluoro-undecyloxy)-1,3-phenylenediamine |
| 5RfxDAM: | 1,3-diamino-5-perfluoroalkyl-mesitylene, or 5-perfluoralkyldiaminomesitylene, x being the number perfluorinated carbon atoms of the perfluoroalkyl group |
| RfxDA: | perfluoroalkyldiamine, x being the number of perfluorinated carbon atoms of the perfluoroalkyl group |
| STN: | super twisted nematic |
| SBE: | super twisted birefringent effect |
| TBA: | tilt bias angle |
| TN: | twisted nematic |

In the following examples all parts and percentages are by weight unless otherwise indicated.

EXAMPLE 1

Preparation of 3,5-Dinitro-1-perfluorohexylbenzene and 3,5-Dinitro-1-perfluorooctylbenzene In a 3-necked 500-ml flask, equipped with a reflux condenser, stirrer, and thermometer, are combined under argon 89.2 g (0.20 mol) of n-perfluorohexyl iodide, 25.4 g (0.40 mol) of copper powder, and 250 ml of dimethyl sulfoxide. The mixture is stirred under argon and heated at 100 to 105° C. for two hours, to effect conversion of the perfluorohexyl iodide to n-perfluorohexylcopper(I). The mixture is cooled to room temperature, and 39.5 g (0.16 mol) of 3,5-dinitrobromobenzene is added. After stirring for two hours at room temperature, the mixture is heated at 80° C. under argon for four hours.

The product mixture is diluted with 1,1,2-trichlorotrifluoroethane (F-113) and filtered. The filter cake is washed with methylene chloride; the filtrate and washes are combined with water, the aqueous layer is separated, and the organic layer is washed with water. The resulting product solution is dried over magnesium sulfate, and solvent is removed by rotary evaporation at reduced pressure. Recrystallization of the residual solid from methanol affords the purified product, 3,5-dinitro-1-perfluoro-hexylbenzene, m.p. 81–82° C.

In the same manner, but using n-perfluorooctyl iodide (0.2 mol) in place of n-perfluorohexyl iodide, is prepared 3,5-dinitro-1-perfluorooctylbenzene, m.p. 110–111° C. following recrystallization from absolute ethanol.

EXAMPLE 2

Preparation of 3,5-Diamino-1-perfluorohexylbenzene

A 28.8 g (59.3 mmol) portion of 3,5-dinitro-1-perfluorohexylbenzene was combined with 200 ml of absolute ethyl alcohol and 3.0 g of 5% palladium on carbon. The mixture was shaken under hydrogen pressure of 60 psi at room temperature for five hours. The resulting hydrogenation mixture was filtered to remove catalyst, and solvent was removed from the filtrate by rotary evaporation at reduced pressure. The residue was recrystallized from hexane to afford 20.1 g (47.1 mmol, 79% of theory) of 3,5-diamino-1-perfluorohexylbenzene, m.p. 73–73.5° C.

EXAMPLE 3

Preparation of 3,5-Diamino-1-perfluorooctylbenzene

A 25.0 g (42.7 mmol) portion of 3,5-dinitro-1-perfluorooctylbenzene was combined with 200 ml of absolute ethyl alcohol and 2.5 g of 5% palladium on carbon. The mixture was shaken under hydrogen pressure of 60 psi at room temperature for four hours. The resulting hydrogenation mixture was filtered to remove catalyst, and solvent was removed from the filtrate by rotary evaporation at reduced pressure. Recrystallization of the residue from hexane provided 19.0 g (42.7 mmol, 85% of theory) of 3,5-diamino-1-perfluorooctylbenzene. The melting point of 3,5-diamino-1-perfluorooctylbenzene is 99–101° C.

EXAMPLE 4

Preparation of 2-Perfluorohexyl-4,6-dinitromesitylene

A one-liter flask was flushed with argon and charged with 119.5 g (0.268 mol) of 1-iodoperfluorohexane, 34.1 g (0.536 mol) of copper powder, and 400 ml of dimethylsulfoxide. The mixture was stirred and heated under an argon atmosphere to 102° C., and held and that temperature for two hours, to effect conversion of the 1-iodoperfluorohexane to perfluorohexyl copper(I).

The reaction mixture was cooled to 60° C., and to it was added 55.0 g (0.190 mol) of 2-bromo-4,6-dinitromesitylene. With continued stirring under argon, the mixture was heated for about 18 hours at 70° C., and then for three hours at 100° C. The reaction mixture was diluted with an approximately equal volume of water, and the precipitated solids were collected by suction filtration. The filtrate was extracted with methylene chloride, and solvent was removed from the extracts by rotary evaporation at reduced pressure. The residue and the filtered solids were combined and extracted with one liter of acetone in a Soxhlet extraction apparatus. The resulting acetone solution was cooled to about 0° C. to effect crystallization of the extracted product. The crystalline solid was collected by suction filtration and dried to afford 65.6 g (65% of theory) of 2-perluorohexyl-4,6-dinitromesitylene, m.p. 125–129° C.

EXAMPLE 5

Preparation of 2-Perfluorohexyl-4,6-diaminomesitylene

A 65.6-g (0.124-mol) portion of 2-perfluorohexyl-4,6-dinitromesitylene from Example 4 was combined with 600 ml of anhydrous ethyl alcohol and 6.5 g of 5% palladium on carbon. The mixture was charged into an autoclave, then heated at 100° C. for seven hours while agitating under a hydrogen pressure of 500 psig.

The hydrogenation mixture was cooled and filtered, and solvent was removed from the filtrate by rotary evaporation at reduced pressure to leave a residue of 58.5 g of crude product. This was recrystallized from one liter of hexane to afford 40.0 g (0.085 mol, 69% of theory) of crystalline product, 2-perfluorohexyl-4,6-diaminomesitylene, m.p. 142–145° C.

EXAMPLE 6

Preparation of 2-Perfluorooctyl-4,6-dinitromesitvlene

A one-liter flask was flushed with argon and charged with 146.3 g (0.268 mol) of 1-iodoperfluorooctane, 34.1 g (0.536 mol) of copper powder, and 400 ml of dimethylsulfoxide. Under an argon atmosphere, the mixture was stirred and heated to 102° C., and held and that temperature for 1.25 hour to effect conversion of the 1-iodoperfluorooctane to perfluorooctyl copper(I).

The reaction mixture was cooled to below 70° C., and to it was added 55.0 g (0.19 mol) of 2-bromo-4,5-dinitromesitylene. The mixture was heated overnight at 68° C., under argon, with continued stirring. A 500-ml portion of water, heated to 60° C., was then added, and the resulting mixture was filtered. The solids were extracted thoroughly with methylene chloride and 1,1,2-trichlorotrifluoroethane. The combined organic extracts were washed with water and dilute sodium bisulfite solution, dried over magnesium sulfate, and solvent was removed by rotary evaporation at reduced pressure, to leave 94.2 g (79% of theory) of crude product, 2-perfluorooctyl-4,6-dinitromesitylene. This was recrystallized from methanol and acetone to give 89.2 g of purified product (75% of theory), m.p. 139–142° C.

EXAMPLE 7

Preparation of 2-Perfluorooctyl-4,6-diaminomesitylene

A 76.9-g (0.122-mol) portion of 2-perfluorooctyl-4,6-dinitro-mesitylene (prepared as described in Example 6) was combined with 600 ml of anhydrous ethyl alcohol and 7.6 g of 5% palladium on carbon. The mixture was charged into an autoclave, then heated at 100° C. for seven hours while agitating under a hydrogen pressure of 500 psig.

The hydrogenation mixture was cooled and filtered, and solvent was removed from the filtrate by rotary evaporation at reduced pressure to leave a residue of crude product. This was digested in hot hexane, treated with decolorizing charcoal, filtered, and the solution cooled to obtain 37.2 g (0.065 mol, 54% of theory) of crystalline product, 2-perfluorooctyl-4,6-diaminomesitylene, m.p. 144.5–146.5° C.

EXAMPLE 8

Preparation of 4-(Perfluorodecylthio)aniline

To a solution of 20.3 g (0.11 mol) of the sodium salt of 4-acetamidothiophenol (Aldrich Chemical Company) in 500 mL dimethylacetamide at 10° C. was added 76.4 g (0.12 mol) of 1-iodoperfluorodecane (Du Pont). The resulting solution was heated under nitrogen at about 90° C. for 21 hours. The solution was poured into 1 L of ice water and the solid product was collected. It was rinsed with water, scurried with 1 L of methanol at 0° C., filtered, recrystallized from 500 mL of ethanol and dried under reduced pressure to give 54.9 g of the acetamide derivative. This acetamide group was hydrolyzed by refluxing the above product in 130 mL of ethanol and 66 mL of conc. hydrochloric acid for 48 hours. The suspension was concentrated on a rotary evaporator and neutralized with aqueous sodium hydroxide. The product was extracted into 4×150 mL of ether. The combine ether extracts were washed with water, dried over anhydrous magnesium sulfate and concentrated on a rotary evaporator. The product was distilled on a Kugelrohr apparatus at 150° C. and 0.4 mm to give 50.44 g of the title amine, mp 72–73° C.

EXAMPLE 9

Preparation of 3-(Perfluorodecyl)propylamine

A one liter Hastelloy pressure vessel was charged with 126.1 g (0.22 mol) of 3-(perfluorodecyl)propionitrile (Du Pont), 20 g of Rainey cobalt, 50 g of anhydrous ammonia and 300 mL of tetrahydrofuran. The vessel was pressured to 800 psi with hydrogen and heated to 110° C. The hydrogen pressure was adjusted to 1500 psi and maintained for 20 hours. The vessel was cooled to room temperature and vented. The solution was decanted and the reaction vessel was rinsed with tetrahydrofuran. The combined solutions were filtered through Celite ® and concentrated on a rotary evaporator at 50° C. The product was distilled through a Vigreux column to give 119.8 g of product, bp 78–80° C. at 1.2 mm as a waxy solid which melted at 53–55° C. The product was redistilled through an 8 in. Vigreux column to give 107.7 g of a center cut, bp 70° C. at 1.8 mm.

EXAMPLE 10

Synthesis of Poly(amic acid) containing 5perfluorooctyl-1,3-phenylenediamine (Rf8MPD)

Into a 100 ml reaction kettle equipped with a mechanical stirrer and a nitrogen inlet and outlet, were charged 6.4446 g (0.020 moles) 3,3',4,4'-benzophenone tetracarboxylic dianhydride (BTDA), 2.0024 g (0.010 moles) 4,4'-oxydianiline (ODA), 0.9733 g (0.009 moles) 1,3-phenylenediamine (m-phenylenediamine, MPD), and 0.5262 g (0.001 moles) of 5-perfluorooctyl-1,3-phenylenediamine (Rf8MPD). Subsequently, 40 ml of N-methylpyrrolidinone (NMP) were added to dissolve the monomers and allow polymerization to proceed. The reaction was carried out under nitrogen and with good stirring overnight (~16 hours) at room temperature to produce a fairly viscous solution of the poly(amic acid) dissolved in NMP. Afterwards, the sample was diluted with an additional 50 ml of NMP, removed from the reactor and further diluted with 100 ml of NMP to produce an approximate 5 wt % solids solution. The sample, containing 5 mole % of Rf8MPD based on total filter prior to use.

EXAMPLE 11

Synthesis of Poly(amic acid) containing 5-perfluorooctyl-1,3-phenylenediamine (Rf8MPD)

A similar procedure to that given in Example 10 was followed except that the following monomer amounts were used:
BTDA = 12.6959 g = 0.0394 moles
ODA = 3.9447 g = 0.0197 moles
MPD = 1.8108 g = 0.016745 moles
Rf8MPD = 1.5549 g = 0.002955 moles
and the BTDA was added as a slurry in 20 ml NMP to a solution (in the reactor) of the diamines in 20 ml NMP. An additional 20 ml NMP was used to rinse in the BTDA slurry and then another 20 ml of NMP was added to bring the polymer concentration to ~20% solids. After reaction, the polymer was diluted to ~5% solids with additional NMP and filtered through a 1 micron filter to give a poly(amicacid) solution containing 7.5 mole % of Rf8MPD units based on total moles diamine.

EXAMPLE 12

Synthesis of Poly(amic acid) containing 5-perfluorooctyl-1,3-phenylenediamine (Rf8MPD)

A similar procedure to that given in Example 10 was followed except that the following monomer amounts were used:
BTDA = 9.6669 g = 0.030 moles
ODA = 3.0036 g = 0.015 moles
MPD = 1.2977 g = 0.012 moles
Rf8MPD = 1.5786 g = 0.003 moles
and the BTDA was added as a dry powder via funnel to a solution (in the reactor) of the diamines in 45 ml of NMP. An additional 20 ml NMP was used to rinse in the BTDA powder from the funnel and then another 20 ml was added to bring the polymer concentration to ~15% solids. After reaction, the polymer was diluted to ~5% solids with additional NMP and filtered through a 1 micron filter to give a poly(amic acid) solution containing 10 mole % of Rf8MPD units based on total moles diamine.

EXAMPLE 13

Synthesis of Poly(amic acid) containing perfluorooctyldiaminomesitylene (Rf8DAM)

A procedure similar to that described in Example 10 was followed, except that 0.5683 g (0.001 moles) perfluorooctyldiaminomesitylene (Rf8DAM) was used in place of Rf8MPD. The reaction was carried out by addition of the BTDA as a slurry in 15 ml NMP to a solution (in the reactor) of the diamines in 15 ml NMP. An additional 10 ml NMP was used to facilitate addition of the slurry giving a polymer concentration of ~20 wt % solids in NMP. After the reaction, the solution was diluted to ~5% solids and filtered through a 1 micron filter giving a poly(amic acid) solution containing 5 mole % of Rf8DAM units based on total moles diamine.

EXAMPLE 14

Synthesis of Poly(amic acid) containing perfluorohexyldiaminomesitylene (Rf6DAM)

A procedure similar to that described in Example 13 was followed, except that 0.4683 g (0.001 moles) perfluorohexyldiaminomesitylene (Rf6DAM) was used in place of Rf8MPD. The reaction was carried out by addition of the BTDA as a slurry in 15 ml NMP to a solution (in the reactor) of the diamines in 15 ml NMP. An additional 10 ml NMP was used to facilitate addition of the slurry giving a polymer concentration of ~20 wt % solids in NMP. After the reaction, the solution was diluted to ~5 % solids and filtered through a 1 micron filter giving a poly(amic acid) solution containing 5 mole % of Rf6DAM units based on total moles diamine.

EXAMPLE 15

Synthesis of Poly(amic acid) containing 5-(1H,1H-2,2-bis [trifluoromethyl]heptafluoropentane)-1,3-phenylenediamine (RfbMPD)

A procedure similar to that described in Example 10 was followed, except that 0.4402 g (0.001 moles) 5-(1H,1H, -2,2-bis [trifluoromethyl]heptafluoropentane)-1,3-phenylediamine (RfbMPD) was used in place of Rf8MPD. The reaction was carried out by addition of the BTDA as a slurry in 15 ml NMP to a solution (in the reactor) of the diamines in 15 ml NMP. An additional 10 ml NMP was used to facilitate addition of the slurry giving a polymer concentration of ~20 wt % solids in NMP. After the reaction, the solution was diluted to ~5% solids and filtered through a 1 micron filter giving a poly(amic acid) solution containing 5 mole % of RfbMPD units based on total moles diamine.

Tilt Angles were measured by method A. Initial values were about 5 to 8 degrees, but upon siting for 24 hours, the initial values decreased to about 1 degree.

EXAMPLE 16

Synthesis of Poly(amic acid) containing 5-perfluorohexyl-1,3-phenylenediamine (Rf6MPD)

A procedure similar to that described in Example 10 was followed, except that 0.4262 g (0.001 moles) 5-perfluorohexyl-1,3-phenylenediamine (Rf6MPD) was used in place of Rf8MPD. The reaction was carried out by addition of the BTDA as a slurry in 15 ml NMP to a solution (in the reactor) of the diamines in 15 ml NMP. An additional 10 ml NMP was used to facilitate addition of the slurry giving a polymer concentration of ~20 wt % solids in NMP. After the reaction, the solution was diluted to ~5% solids and filtered through a 1 micron filter giving a poly(amic acid) solution containing 5 mole % of Rf6MPD units based on total moles diamine.

EXAMPLE 17

Synthesis of Poly(amic acid) containing 5-trifluoromethyl-1,3-phenylene diamine (Rf1MPD)

A procedure similar to that described in Example 10 was followed, except that 0.1761 g (0.001 moles) 5-trifluoromethyl-1,3-phenylene diamine (Rf1MPD) was used in place of Rf8MPD. The reaction was carried out by addition of the BTDA as a slurry in 15 ml NMP to a solution (in the reactor) of the diamines in 15 ml NMP. An additional 10 ml NMP was used to facilitate addition of the slurry giving a polymer concentration of ~20 wt % solids in NMP. After the reaction, the solution was diluted to ~5% solids and filtered through a 1 micron filter giving a poly(amic acid) solution containing 5 mole % of Rf1MPD units based on total moles diamine.

EXAMPLE 18

Synthesis of Poly(amic acid) containing 4-(1,1,11-trihydroperfluoroundecyloxy)1,3-phenylenediamine (Rf10-0-MPD)

A procedure similar to that described in Example 10 was followed, except that 0.6382 g (0.001 moles) 4-(1,1,11-trihydroperfluoroundecyloxy)-1,3-phenylenediamine (Rf10-0-MPD) was used in place of Rf8MPD. The reaction was carried out by addition of the BTDA as a slurry in 15 ml NMP to a solution (in the reactor) of the diamines in 15 ml NMP. An additional 10 ml NMP was used to facilitate addition of the slurry giving a polymer concentration of ~20 wt % solids in NMP. After the reaction, the solution was diluted to ~5% solids and filtered through a 1 micron filter giving a poly(amic acid) solution containing 5 mole % of Rf10-0-MPD units based on total moles diamine.

EXAMPLE 19

Synthesis of Poly(amic acid) containing 5-(1H,1H-2,2-bis[trifluoromethyl]heptafluoropentane)-1,3-phenylenediamine (RfbMPD)

A procedure similar to Example 10 was followed except that the following monomer amounts were used:
BTDA = 2.5078 g = 0.0077826 moles
ODA = 0.7792 g = 0.0038913 moles
RfbMPD = 1.7130 g = 0.0038913 moles The monomers were dissolved initially in 15 ml NMP (~25% solids) but because of the high viscosity obtained at this concentration an additional 5 ml of NMP was added 25 minutes after the start of the reaction (~20% solids). Afterwards the poly(amic acid) solution containing 50 mole % of RfbMPD units based on total diamine was diluted to ~10% solids with 25 ml NMP and filtered through a 1 micron filter.

EXAMPLE 20

Synthesis of Poly(amic acid) containing 5-(1H,1H-2,2-bis[trifluoromethyl]heptafluoropentane)-1,3-phenylenediamine (RfbMPD) as the only diamine Into a 100 ml reaction kettle equipped with a mechanical stirrer and a nitrogen inlet and outlet, were charged 4.0121 g (0.009114 moles) 5-(1H,1H-2,2-bis[trifluoromethyl]heptafluoropentane)-1,3-phenylenediamine (RfbMPD). After dissolving the diamine in about 20 ml N-methylpyrrolidinone (NMP), 1.9879 g (0.009114 moles) of dried pyromellitic dianhydride (PMDA) were added in solid form. The funnel used to add the solid PMDA was subsequently washed with about 10 ml NMP to bring the total solvent added to 30 ml. The PMDA reacted and dissolved into the mixture to give a fairly viscous solution of the poly(amic acid) in NMP. The stirring overnight (~16 hours) at room temperature. Afterwards, the sample was removed from the reactor and filtered through a 10 micron filter prior to use.

EXAMPLE 21

Synthesis of Poly(amic acid) containing 5-perfluorooctyl-metaphenylenediamine (Rf8MPD)

To a three necked, 500 ml flask equipped with an overhead stirrer, nitrogen ($N_2$) inlet/outlet with bubbler pressure head, and solids addition funnel, there were added 174 grams of N-methyl-pyrrolidone (NMP); the solvent was stirred several minutes to insure $N_2$ entrainment. Oxydianiline (ODA), 5.01 g (0.025 mole), meta-phenylenediamine (MPD), 2.44 g (0.0225 mole), and 1.31 g of a 5-perfluorooctylmetaphenylenediamine (Rf8MPD) 1.31 g (0.0025 mole) were then added to the flask. The amines were stirred for 5 minutes, after which time they had fully dissolved to yield a dark red-brown solution. Next, benzophenonetetracarboxylic dianhydride (BTDA), 16.11 g (0.05 mole), was added in four equal portions. Each portion was allowed to react slowly, with the temperature not allowed to exceed 30-33° C. The BTDA addition was completed after about one hour. The mixture thus obtained was clear, and dark-amber in color. Its viscosity appeared to increase with time. The reaction mixture was allowed to stir for 36 hours. The stirring was interrupted several times during this time due to power failures. After this time it was bottled and stored in a 5° C. refrigerator.

EXAMPLE 22

Preparation and Evaluation of liquid Crystal Cell

Method A

A 7% solids solution was prepared of the polymer in example 21 by dilution with pure NMP solvent. A Silicon wafer (Si) was treated with an adhesion promoter, Du Pont VM-651 (as a 0.05% aqueous solution), and the polymer was applied by spin coating at 4,000 RPM. Ellipsometry and profilometry revealed a coating thickness of about 3500 Å. Using the same spin speed as used for the Si Wafer, a similar film was applied to ITO coated Corning #7059 glass substrates, upon which one edge had received a Cr coating. These were cured by baking at 90° C. for 15 minutes followed by a ramping oven temperature profile which ranged from 150° C. to 250° C.; on reaching the 250° C., this was held for ½ hour and allowed to cool slowly to room temperature.

The polymer coated parts were then rubbed with the Aramid pile buffing wheel. Du Pont Pyralux TM Sheet Adhesive was used to laminate the two cell plates together such that the rubbing directions of the plates were opposed, i.e., anti-parallel. The glass/ITO +Pyralux TM +ITO/Glass construction was eliminated at 150° C. under 50 psi.

The assembled LCD test cell was filled with an LC mixture, E. Merck (Darmstadt, Germany) ZLI-2293, by pulling a vacuum on one fill hole while placing drops of ZLI-2293 over the other port. After filling was complete, the ports were sealed with LOCTITE UV-curable adhesive (LITETAK #375). It was cleared by heating at 90° C. for 30 minutes.

The test cell was examined in the Varian E-90 system cited above. Analysis of the reduced capacitance versus angle revealed a tilt angle of 7.7 degrees.

EXAMPLE 23

Synthesis of Poly(amic acid) containing 5-perfluorooctyl-metaphenylenediamine (Rf8MPD)

In a similar manner to the preparation of Example 21, a second trial was run. This time the scale of the reaction was increased to the following levels:
BTDA: 0.075 mole
ODA: 0.0375 mole
MPD: 0.03375 mole
Rf8MPD: 0.00375 mole.

The average weight molecular weight was determined by gel permeation chromatography (GPC) and found to be about 209,000.

EXAMPLE 24

Alignment Film Evaluation

Method B

*Method A appears previously on page 49.

A 4% solids dilution of the polymer obtained in Example 23 gave film thicknesses ranging from 3000 A to approximately 500 A over the spin speed range of 3,000–6,000 RPM. Similar increases in the refractive indices to that in Example 22 were observed.

EXAMPLE 25

Method B

*Method A appears previously on page 49.

Donnelly 5005 (ITO on soda lime glass) was spin coated with 0.05% aqueous Du Pont VM-651 adhesion promoter, and followed by an immediate 45 second bake at 90° C. Immediately thereafter, a 4% solids solution of the polymer from Example 23 was spun coated onto these parts. The spin speed was 3000 RPM. The parts were softbaked 45 seconds at 90° C. on a SVG-81 hot plate, then cured with a 260° C. peak temperature. Ellipsometry revealed a film thickness of about 1000 Å.

The cells were screen printed with EPOXY TECHNOLOGY B-9021-6, screen printed with conductor stripes of Du Pont PE-4621D silver, laminated at 150° C. under 30 psi, filled with E. Merck ZLI-2293, cleared at 90° C., and electrical wires attached by soldering to the silver stripes.

Figure 4:
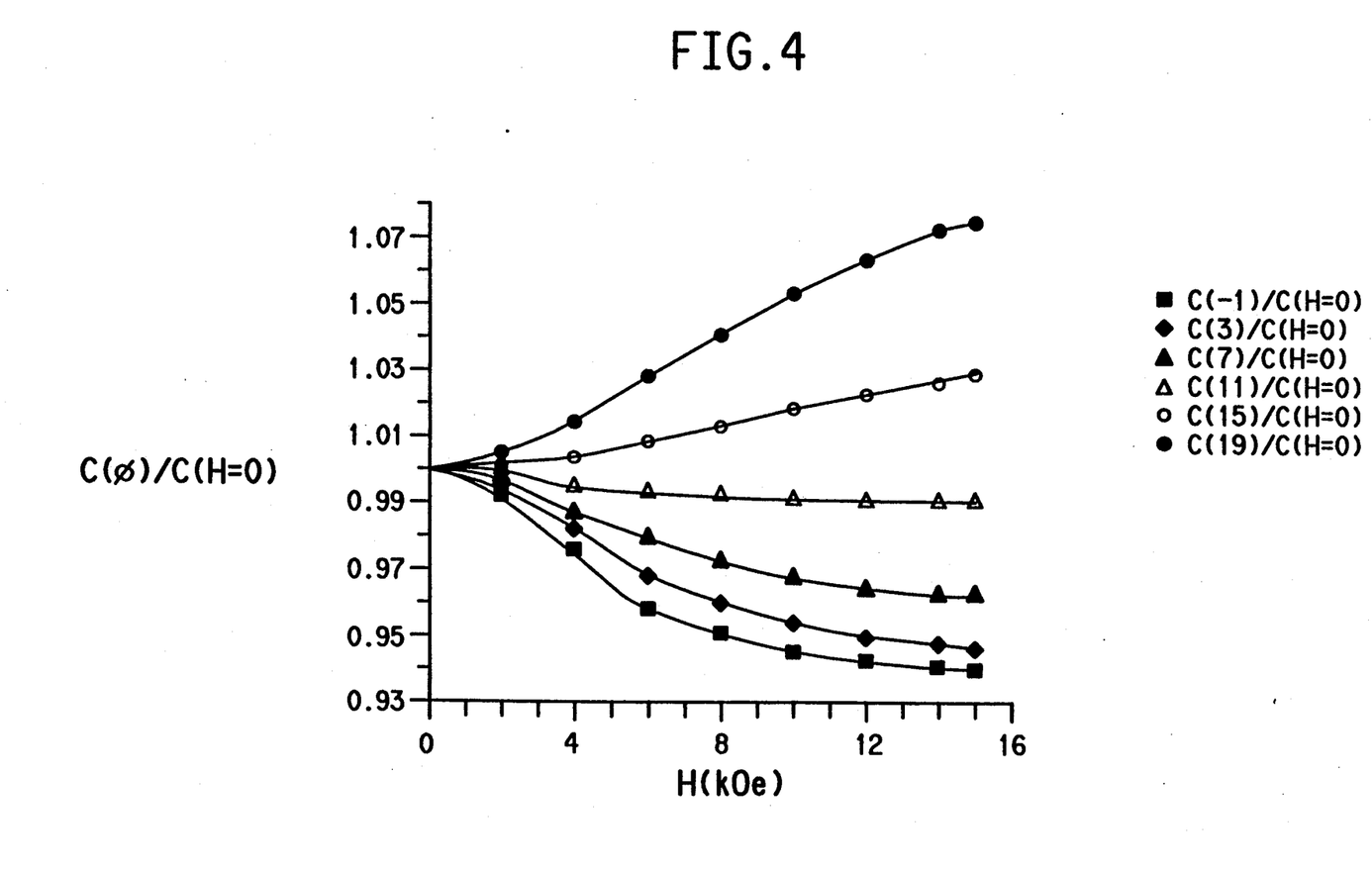
FIG. 4 and FIG. 5 show curves produced by the data obtained by the device of FIG. 3.
Figure 5:
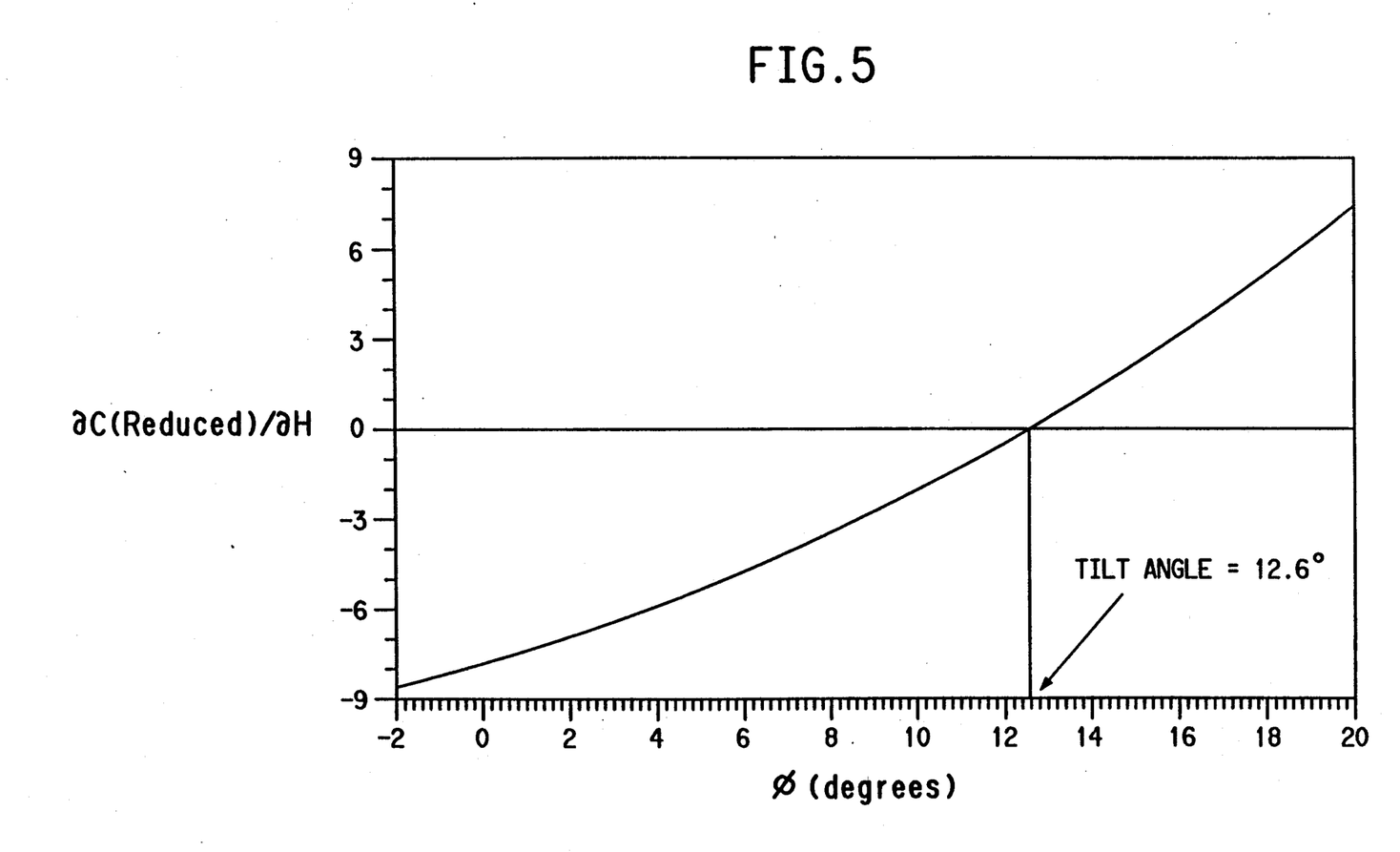

The cells were rotated in the PAR-151 magnet system, and the results shown in FIGS. 4 and 5 were observed, from which the tilt angle was determined to be 12.6 degrees.

In FIG. 4, the ratio of capacitance at angle $\phi$ (phi) to the capacitance at zero applied magnetic field $C(\phi(phi))/C(H=0)$ versus the magnetic field H in Kilo Oersted (kOe) units is plotted for different values of angles $\phi$ (phi) (in this particular case, at angles having values of $-1, 3, 7, 11, 15$, and 19 degrees). The derivative of the slope of these curves in the linear region (between 5 and 8 kOe in this case) with respect to the applied magnetic field is plotted versus the angle $\phi$ (phi), as shown in FIG. 5. The Tilt angle corresponds to the angle at the point where the derivative passes through 0 as indicated in FIG. 5.

EXAMPLE 26

Comparative Example

A 4% solids solution was prepared from Du Pont Pyralin PI-2555 material. PI-2555 is a commercial material based on BTDA/ODA/MPD.

An LCD cell was prepared according to Method (A) cited above. The tilt angle was found to be 2.3 degrees.

EXAMPLE 27

Preparation and Evaluation of polyimide containing 3-perfluorodecyl-1-propylamine A 10 mol % end capped polyimide was prepared by treating a 7% solids solution of Du Pont Pyralin PI-2545 with 3-perfluorodecyl-1-propylamine (3-PFDPA), which was prepared as shown in Example 9.

Thus 3.78 g of 3-PFDPA was added to roughly 390 g of a 7 wt % solution of PI-2545. The mixture was stirred overnight at room temperature, filtered, and used to prepare a LCD test cell as in Example 22. The tilt angle was found to be 16.7 degrees.

EXAMPLE 28

Preparation and Evaluation of polyimide containing perfluorinated mono-amine

A 10 mol % end cap of 3-perfluorooctylaniline was prepared using PI-2545 polyimide in a similar manner as in the case of Example 27. These materials required xylene co-solvents, and much longer stirring times, 5 days, before clear homogenous solutions could be obtained.

A Liquid Crystal Display Cell prepared in a similar manner as before gave a tilt angle of 9.67 degrees.

3-perfluorooctylaniline may be prepared as follows:

In a 500-ml three-necked flask, equipped with a magnetic stirrer, thermometer, and condenser with gas inlet, are combined under argon 19.1 g (0.30 mol) of copper powder, 81.9 g (0.15 mol) of n-perfluorooctyl iodide, and 250 ml of dimethylsulfoxide. The mixture is stirred and heated under argon at 100–105° C. for 1.25 hours, to effect conversion of the perfluorooctyl iodide to perfluorooctylcopper. The mixture is then cooled to room temperature, and to it is added, with stirring under argon, a 27.4 g (0.125 mol) portion of 3-iodoaniline. Stirring is continued under argon at room temperature overnight, and then for two hours at 60° C. to complete the reaction.

The product mixture is diluted with water, and extracted with a mixture of diethyl ether and methyl t-butyl ether. The combined organic extracts are washed with water and dried over anhydrous magnesium sulfate. Following removal of solvent at reduced pressure, the product is purified by distillation under vacuum: b.p. 77–82° C. (0.3 torr).

EXAMPLE 29

Evaluation of polyimide containing only 5-(1H,1H-2,2-bis[trifluoromethyl]heptafluoropentane-1,3-phenylenediamine as diamine A sample of polyimide made as described in Example 20 was diluted to 1.42 wt % in pure NMP. Silicon wafers were treated with VM-651 adhesion promoter (Du Pont) as above and spun-coated with the sample.

After curing, ellipsometry and visual inspection revealed excellent coating. Films thicknesses ranged from about 130 A at 4,000 RPM to approximately 200 A at 2,000 RPM. The refractive indices were observed to increase as the film thickness decreased, thus proving that the film had homogeneously coated the Si even down to about 130 A.

EXAMPLE 30

Comparative Example

In a manner similar to Example 26, Du Pont Pyralin PI-2545, which is a commercial polymer based on PMDA (Pyromellitic dianhydride) and ODA (Oxydianiline), was diluted to 6% solids with NMP. A Liquid Crystal Display Cell was prepared in the manner of Example 22. The tilt angle was found to be 2.5 degrees (See Table II).

EXAMPLE 31

Comparative Example

In a manner similar to Example 26, Du Pont Pyralin PI2611, a commercial polymer based on BPDA (biphenyldianhydride) and PPD (p-phenylenediamine) was diluted to 5% solids with NMP. A Liquid Crystal Display Cell was prepared as in Example 22. The tilt angle was found to be about 3 degrees.

EXAMPLE 32

Synthesis of Poly(amic acid) containing perfluorohexyldiaminomesitylene (Rf6DAM) at higher level A similar procedure to that given in Example 10 was followed except that the following monomer amounts were used:

BTDA = 6.4446 g = 20.00 mmol
ODA = 2.0024 g = 10.00 mmol
MPD = 0.9400 g = 8.6922 mmol
Rf6DAM = 0.6124 g = 1.3078 mmol and the BTDA was added as a slurry in 15 ml NMP to a solution (in the reactor) of the diamines in 15 ml NMP. An additional 10 ml NMP was used to rinse in the BTDA slurry (~20% solids). After reaction, the polymer was diluted to ~5% solids with additional NMP and filtered through a 1 micron filter to give a poly(amic acid) solution containing 6.54 mole % of Rf6DAM units based on total moles diamine. This sample contained the same wt % fluorine as the sample containing Rf8DAM at 5 mole % based on total diamine as given in Example 13. See also Table II for properties and comparisons.

What is claimed is:

1. In an improved liquid crystal display device of the type having a common liquid crystal layer with opposite sides, a set of electrodes on either side of the liquid crystal layer, and an alignment polyimide layer between each set of electrodes and the common liquid crystal layer, wherein the improvement comprises the polyimide layer contains pendant perfluorinated hydrocarbon chains of more than 6 perfluorinated carbon atoms, wherein the polyimide layer comprises a reaction product of an acid dianhydride and a diamine, and wherein the pendant perfluorinated chains are part of the diamine.

2. The liquid crystal display device as defined in claim 1, wherein the alignment polyimide layer is adaptable to provide the liquid crystal layer with a constant tilt angle of 5 degrees or more.

3. The liquid crystal display device as defined in claim 1, wherein the pendant perfluorinated chains are contained in the polyimide in an effective amount to provide the liquid crystal layer with a constant tilt angle of 5 degrees or more.

4. The liquid crystal display device as defined in claim 1, wherein the dianhydride is 3,3',4,4'-benzophenonetetracarboxylic acid dianhydride.

5. The liquid crystal display device as defined in claim 1, wherein the pendant perfluorinated chain is linear.

6. The liquid crystal display device as defined in claim 5, wherein the pendant perfluorinated chain comprises 8 or more perfluorinated carbon atoms.

7. The liquid crystal display device as defined in claim 6, wherein the diamine is 3,5-diamino-1-perfluorooctylbenzene.

8. The liquid crystal display device as defined in claim 7, wherein the dianhydride is 3,3',4,4'-benzophenonetetracarboxylic acid dianhydride.

9. The liquid crystal display device as defined in claim 6, wherein the diamine is 2-perfluorooctyl-4,6-diaminomesitylene.

10. The liquid crystal display device as defined in claim 9, wherein the dianhydride is 3,3',4,4'-benzophenonetetracarboxylic acid dianhydride.

11. The liquid crystal display device as defined in claim 6, wherein the diamine is 4-(1,1,11-trihydroperfluorounecyloxy)-1,3-phenylenediamine.

12. The liquid crystal display device as defined in claim 11, wherein the dianhydride is 3,3',4,4'-benzophenonetetracarboxylic acid dianhydride.

* * * * *